(12) United States Patent  
Yang et al.

(10) Patent No.: US 12,100,035 B2  
(45) Date of Patent: Sep. 24, 2024

(54) METHOD AND APPARATUS FOR ACQUIRING RECIPIENT INFORMATION

(71) Applicant: Beijing Jingdong Zhenshi Information Technology Co., Ltd., Beijing (CN)

(72) Inventors: Kai Yang, Beijing (CN); Runjie Yang, Beijing (CN); Jianhui Yang, Beijing (CN); Meiling Zeng, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 414 days.

(21) Appl. No.: 17/608,499

(22) PCT Filed: Mar. 26, 2020

(86) PCT No.: PCT/CN2020/081319  
§ 371 (c)(1),  
(2) Date: Nov. 3, 2021

(87) PCT Pub. No.: WO2020/200022  
PCT Pub. Date: Oct. 8, 2020

(65) Prior Publication Data

US 2022/0301089 A1   Sep. 22, 2022

(30) Foreign Application Priority Data

Mar. 29, 2019 (CN) .......................... 201910250055.0  
May 29, 2019 (CN) .......................... 201910455946.X

(51) Int. Cl.  
*G06Q 30/00* (2023.01)  
*G06F 40/174* (2020.01)  
(Continued)

(52) U.S. Cl.  
CPC ....... *G06Q 30/0633* (2013.01); *G06F 40/174* (2020.01); *H04L 67/146* (2013.01)

(58) Field of Classification Search  
CPC .................................................. G06Q 30/0633  
See application file for complete search history.

(56) References Cited

U.S. PATENT DOCUMENTS 10,581,770 B2   3/2020  Yu et al.  
2009/0043670 A1*  2/2009  Johansson ............. G06Q 30/06  
                                                                 705/26.2

(Continued)

FOREIGN PATENT DOCUMENTS

CN   106709779 A   5/2017  
CN   107085786 A   8/2017  
(Continued)

OTHER PUBLICATIONS

Kim, Namil, and Wonjoon Kim. "Do your social media lead you to make social deal purchases? Consumer-generated social referrals for sales via social commerce." International Journal of Information Management 39 (2018): 38-48.*

(Continued)

*Primary Examiner* — Kathleen Palavecino  
(74) *Attorney, Agent, or Firm* — Blank Rome LLP

(57) ABSTRACT

A method and a device for acquiring information of recipient is provided. The detailed description of an embodiment of the method comprises: receiving a sharing instruction from a user regarding a target link, the target link being used for directing to an order filling interface related to a shipping order corresponding to a recipient in a target shipping application, and the sharing instruction being used for instructing to share the target link with the recipient; executing a corresponding sharing operation on the basis of the sharing instruction so that the recipient fills in the information thereof on the order filling interface to which the shared target link is directed and submits the recipient information to a first server that provides support for the target shipping (Continued)

application; and receiving the recipient information returned from the first server.

15 Claims, 7 Drawing Sheets

(51) Int. Cl.
*G06Q 30/0601* (2023.01)
*H04L 67/146* (2022.01)

(56) References Cited

U.S. PATENT DOCUMENTS

| | | | |
|---|---|---|---|
| 2012/0185355 A1* | 7/2012 | Kilroy | G06Q 30/0633 705/26.8 |
| 2013/0268377 A1* | 10/2013 | Jessup | G06Q 10/101 705/26.2 |
| 2014/0129392 A1 | 5/2014 | Hanayama et al. | |
| 2014/0278875 A1* | 9/2014 | Ganesh | G06Q 30/0605 705/14.23 |
| 2017/0262798 A1 | 9/2017 | Kosseifi et al. | |
| 2018/0220272 A1 | 8/2018 | Brooks et al. | |
| 2020/0111139 A1* | 4/2020 | Dogin | G06Q 30/0605 |
| 2022/0156684 A1* | 5/2022 | Erez | G06Q 30/0222 705/26.1 |
| 2023/0035712 A1* | 2/2023 | Sharma | G06Q 30/0641 |
| 2023/0237421 A1* | 7/2023 | Konovalov | G06Q 10/0832 705/330 |

FOREIGN PATENT DOCUMENTS

| | | |
|---|---|---|
| CN | 108090723 A | 5/2018 |
| CN | 108090728 A | 5/2018 |
| CN | 108573361 A | 9/2018 |
| JP | 2002-169918 A | 6/2002 |
| JP | 2010-160766 A | 7/2010 |
| JP | 2013-193856 A | 9/2013 |
| JP | 2019-505878 A | 2/2019 |
| WO | WO-2013-008849 A1 | 1/2013 |

OTHER PUBLICATIONS

International Search Report for PCT/CN2020/081319, dated May 29, 2020, 2 pages.
WeChat public Platform Commercial Application Construction, Payment Development and Operation and Maintenance Practice, Section 5.5.6, 2018, 4 pgs.
First Office Action for CN 201910455946.X, dated Nov. 26, 2020, 7 pgs.
Second Office Action for CN 201910455946.X, dated May 18, 2021, 8 pgs.

* cited by examiner

500

501 — Receive from a user a sharing instruction regarding a target link, where the target link is used for pointing to an order filling interface in the target shipping application related to bulk shipping order corresponding to at least two recipients, the sharing instruction is used for instructing to share the target link to the target group chat in the target social application, and the group members of the target group chat include above-mentioned at least two recipients 502 — Perform a corresponding sharing operation based on the sharing instruction, so that the above at least two recipients fill in the recipient information through the order filling interface pointed to by the target link shared to the target group chat, and submit the recipient information to the first server that provides support for the target shipping application 503 — In response to a check instruction of the user on the order filling interface pointed to by the target link, send a recipient information acquisition request related to the above-mentioned at least two recipients to the first server 504 — Receive recipient information returned by the first server 505 — Fill the received recipient information in a corresponding position in the order filling interface pointed to by the target link, and show the user the order filling interface with the recipient information being filled therein

Fig. 5

METHOD AND APPARATUS FOR ACQUIRING RECIPIENT INFORMATION

CROSS-REFERENCE TO RELATED APPLICATIONS

The present disclosure is a U.S. National Stage of International Application No. PCT/CN2020/081319, filed on Mar. 26, 2020, which claims the priorities of Chinese patent application No. 201910250055.0 filed on Mar. 29, 2019, entitled "Method and Apparatus for Acquiring Recipient Information", and Chinese patent application No. 201910455946.X filed on May 29, 2019, entitled "Method and Apparatus for Acquiring Recipient Information", the aforementioned patent applications are hereby incorporated by reference in their entireties.

TECHNICAL FIELD

Embodiments of present disclosure relate to the field of computer technology, and particularly to method and apparatus for acquiring recipient information.

BACKGROUND

With the rapid development of the mobile Internet, various applications emerge in endlessly. For example, existing shipping applications. Users may place single shipping order and bulk shipping order through the shipping application.

When placing a single shipping order, the user may manually enter the sender information and the recipient information in the corresponding order filling interface. Before placing a bulk shipping order, user may enter the recipient information of multiple recipients in the shipping application, and then manually enter the sender information and select the recipient information entered before in the corresponding order filling interface when placing the bulk shipping order.

SUMMARY

Embodiments of present disclosure propose a method and apparatus for acquiring recipient information.

In the first aspect, embodiments of the present disclosure provide a method for acquiring recipient information, applied to a first terminal, the method includes: receiving from a user a sharing instruction regarding a target link, wherein the target link is used for pointing to an order filling interface related to a shipping order corresponding to a recipient in a target shipping application, the sharing instruction is used for instructing to share the target link with the recipient; performing a corresponding sharing operation based on the sharing instruction, so that the recipient fills in the recipient information through the order filling interface pointed to by the shared target link, and submits the recipient information to a first server providing support for the target shipping application; and receiving the recipient information returned by the first server.

In a second aspect, an embodiment of the present disclosure provides an apparatus for acquiring recipient information, applied to a first terminal, the apparatus includes: a first receiving unit, configured to receive from a user a sharing instruction regarding a target link, the target link being used for pointing to an order filling interface related to a shipping order corresponding to a recipient in a target shipping application, the sharing instruction being used for instructing to share the target link with the recipient; a sharing unit, configured to perform a corresponding sharing operation based on the sharing instruction so that the recipient fills in the recipient information through the order filling interface pointed to by the shared target link, and submits the recipient information to a first server providing support for the target shipping application; and a second receiving unit, configured to receive the recipient information returned by the first server.

In a third aspect, an embodiment of the present disclosure provides an electronic device that includes: one or more processors; and a storage apparatus, storing one or more programs thereon, when executed by the one or more processors, cause the one or more processors to implement the method described in any embodiment of the first aspect.

In a fourth aspect, an embodiment of the present disclosure provides a computer-readable medium, a computer program being stored thereon, when the program is executed by a processor, the method as described in any embodiment of the first aspect is implemented.

BRIEF DESCRIPTION OF THE DRAWINGS

By reading the detailed description of the non-limiting embodiments with reference to the following drawings, further features, purposes and advantages of the present disclosure will become clearer:

FIG. 5 is a flowchart of a method for acquiring recipient information according to another embodiment of the present disclosure;

DETAILED DESCRIPTION OF EMBODIMENTS

Embodiments of the present disclosure will be described in detail below with reference to the accompanying drawings. It may be understood that embodiments described herein are only used to explain the related disclosure, but not to limit the disclosure. In addition, it should also be noted that, for ease of description, only parts related to the relevant disclosure are shown in the accompanying drawings.

It should be noted that embodiments in the present disclosure and features in embodiments may be combined with each other on a non-conflict basis. Embodiments of the present disclosure will be described below in detail with reference to the accompanying drawings.

Figure 1:
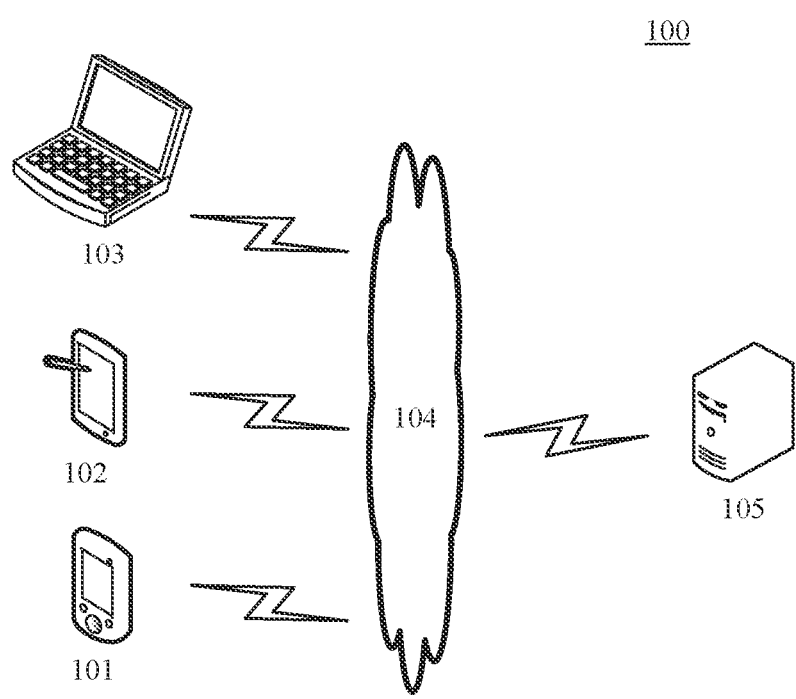
FIG. 1 is an exemplary system architecture diagram in which some embodiments of the present disclosure may be applied.

FIG. 1 shows an exemplary system architecture 100 to which an embodiment of the method for acquiring recipient information or the apparatus for acquiring recipient information of the present disclosure may be applied.

As shown in FIG. 1, the system architecture 100 may include first terminals 101, 102, 103, a network 104, and a first server 105. The network 104 is used to provide a medium for communication links between the first terminals 101, 102, 103 and the first server 105. The network 104 may include various types of connections, such as wired, wireless communication links, or fiber-optic cables.

The user may use the first terminal 101, 102, 103 to interact with the first server 105 via the network 104 to receive or send messages, and so on, for example, to receive the recipient information returned from the first server 105. The first terminal(s) 101, 102, 103 may be installed with social applications, shipping applications, short message applications, email applications, etc.

The first terminals 101, 102, 103 may be hardware or software. When the first terminals 101, 102, 103 are hardware, they may be various electronic devices, including but not limited to smart phones, tablet computers, laptop computers, and so on. When the first terminals 101, 102, 103 are software, they may be installed in the electronic devices listed above. They may be implemented as multiple software or software modules (for example, to provide distributed services), or as a single software or software module, which is not specifically limited herein.

The first server 105 may be a server that provides various services, for example, a background server that provides support for the shipping application installed on the first terminal(s) 101, 102, 103, and the background server may store recipient information required by the first terminal, and may also return the recipient information to the first terminal. The recipient information may be submitted to the background server by the recipient to which this information belongs.

It should be noted that the methods for acquiring recipient information provided by some embodiments of the present disclosure are generally executed by the first terminal(s) 101, 102, 103. Accordingly, the apparatus for acquiring recipient information is generally provided in the first terminal(s) 101, 102, 103.

It should be noted that the server may be hardware or software. When the server is hardware, it may be implemented as a distributed server cluster composed of a plurality of servers, or as a single server. When the server is software, it may be implemented as a plurality of software or software modules (for example, for providing distributed services), or as a single software or software module, which is not specifically limited herein.

It should be understood that the number of terminal devices, networks, and servers in FIG. 1 is merely illustrative. Depending on the implementation needs, there may be any number of terminal devices, networks, and servers.

Figure 2:
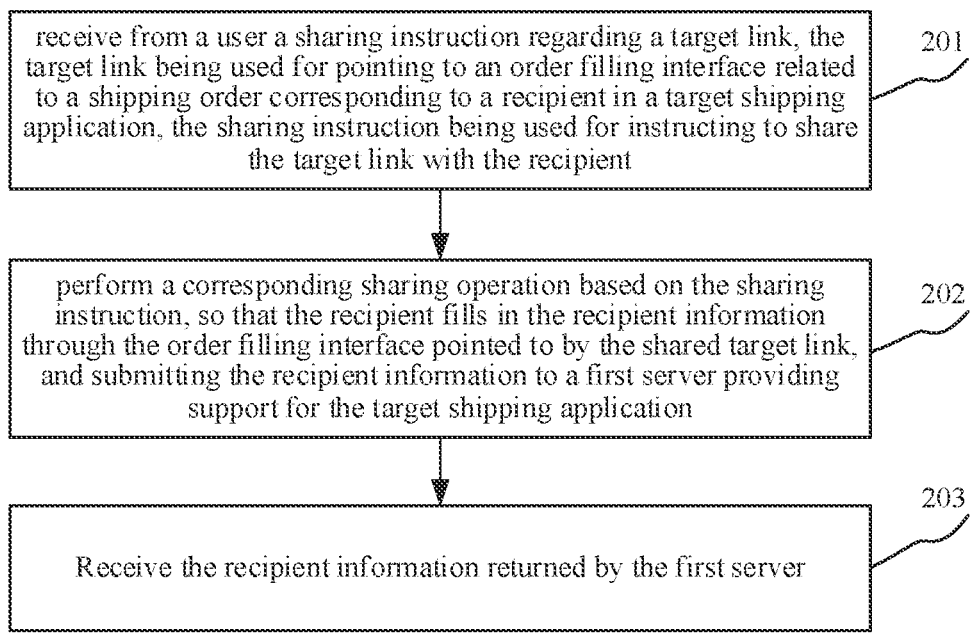
FIG. 2 is a flowchart of a method for acquiring recipient information according to an embodiment of the present disclosure.

With further reference to FIG. 2, a flow 200 of a method for acquiring recipient information according to an embodiment of the present disclosure is shown. The flow 200 of the method for acquiring recipient information includes the following steps:

Step 201: receiving from a user a sharing instruction regarding a target link, the target link is used for pointing to an order filling interface related to a shipping order corresponding to a recipient in a target shipping application, the sharing instruction is used for instructing to share the target link with the recipient.

In this embodiment, the execution body of the method for acquiring recipient information may be the first terminal (for example, the first terminal 101, 102, or 103 shown in FIG. 1). The first terminal may receive from the user a sharing instruction regarding a target link in real time. The target link may be used for pointing to an order filling interface related to a shipping order corresponding to a receipt in the target shipping application. The target shipping application may be a shipping application installed on the first terminal. The sharing instruction may be used for instructing to share the target link with the recipient.

As an example, if any type of the following applications is installed on the first terminal: an email application, a short message application, a social application; and the recipient is the user's contact in the type of application, the sharing instruction may include, for example, a target link, an application identifier of the type of application, and this recipient's identifier in the type of application, etc.

It should be noted that the above-mentioned shipping order may be a single shipping order corresponding to one recipient, or a bulk shipping order corresponding to at least two recipients, which is not specifically limited herein.

Step 202: performing a corresponding sharing operation based on the sharing instruction, so that the recipient fills in the recipient information through the order filling interface pointed to by the shared target link, and submits the recipient information to a first server providing support for the target shipping application.

In this embodiment, the first terminal may perform a corresponding sharing operation based on the received sharing instruction so that the recipient may fill in the recipient information through the order filling interface pointed to by the shared target link, and submit the recipient information to the first server (for example, the first server 105 shown in FIG. 1) that provides support for the target shipping application.

As an example, if the sharing instruction includes the target link, the application identifier, and the recipient's identifier in the application indicated by the application identifier, the first terminal may send the target link to the server that provides support for this application, so that the server sends the target link to a second terminal used by the recipient, thus the second terminal displays the target link to the recipient through the application installed on the second terminal. If the recipient sees the shared target link, the receipt may open the corresponding order filling interface by triggering the target link. The recipient may fill in the corresponding recipient information on the order filling interface, and then submit the recipient information to the first server by performing a preset recipient information submission operation. For example, the first server may actively send the received recipient information to the first terminal. Optionally, the first server may also send the received recipient information to the first terminal in response to receiving the recipient information acquisition request related to the recipient sent by the first terminal.

It should be noted that the recipient information may include, but is not limited to, the recipient's name, telephone number, recipient address, and so on.

Step 203: Receiving the recipient information returned by the first server.

In this embodiment, the first terminal may receive the recipient information returned by the first server.

Optionally, the first terminal may also automatically display the received recipient information to the user. For example, the first terminal may automatically fill the received recipient information in a corresponding position in the order filling interface, and show the user the order filling interface after the recipient information is filled therein.

In some alternative implementations of this embodiment, the recipient information received by the first terminal from the first server may be desensitized information. For example, part of the recipient information has been replaced with special characters such as "*" and "#". It should be noted that by desensitizing the recipient information, the security of the recipient information can be ensured and the recipient information can be prevented from being leaked.

In some alternative implementations of this embodiment, if the recipient information received from the first server is information that has not been desensitized, the first terminal may first desensitize the received recipient information according to a preset desensitization rule. Then the desensitized recipient information is filled in the corresponding position in the order filling interface, and the order filling interface with the recipient information filled therein is shown to the user.

In the method provided by the above-mentioned embodiment of the present disclosure: receiving from a user a sharing instruction regarding a target link, where the target link is used for pointing to an order filling interface related to a shipping order corresponding to a recipient in a target shipping application, the sharing instruction is used for instructing to share the target link with the recipient; and then performing the corresponding sharing operation based on the sharing instruction, so that the recipient may fill in the recipient information through the order filling interface pointed to by the shared target link, and submit the recipient information to the first server that provides support for the target shipping application; and then receiving the recipient information returned by the first server. Since recipient information is not need to be manually filled in by the user, rapid acquisition of recipient information can be achieved while the user's operating cost can be saved.

Figure 3:
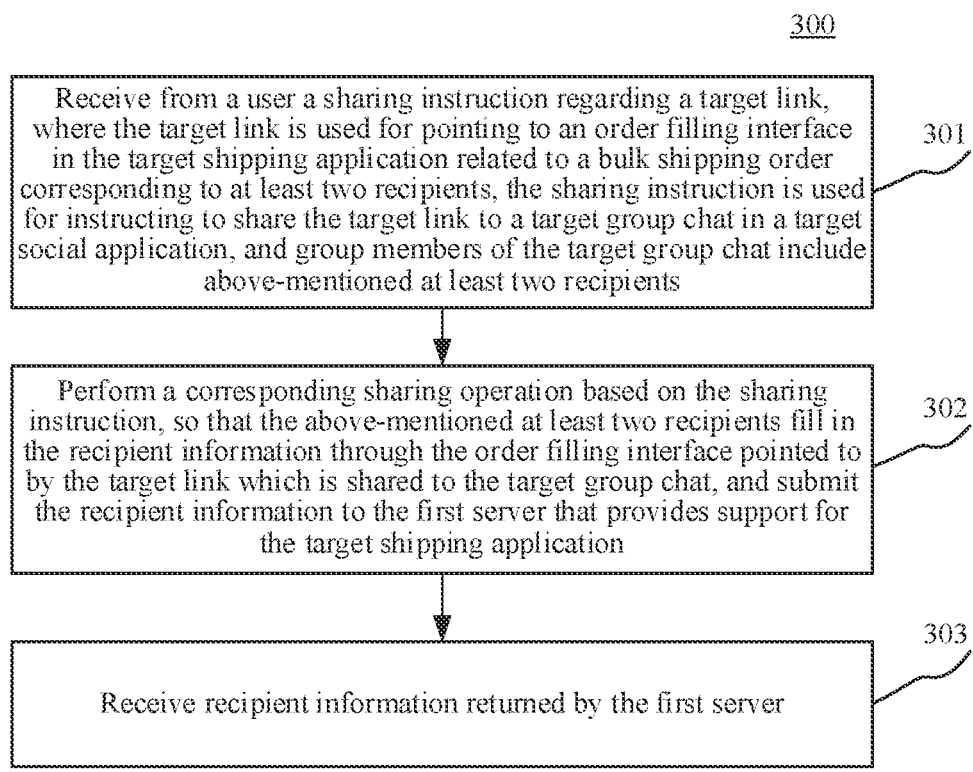
FIG. 3 is a flowchart of a method for acquiring recipient information according to another embodiment of the present disclosure.

With further reference to FIG. 3, a flow 300 of a method for acquiring recipient information according to another embodiment of the present disclosure is shown. The flow 300 of the method for acquiring recipient information includes following steps:

Step 301: Receiving from a user a sharing instruction regarding a target link, where, the target link is used for pointing to an order filling interface in the target shipping application related to a bulk shipping order corresponding to at least two recipients, the sharing instruction is used for instructing to share the target link to a target group chat in a target social application, and group members of the target group chat include above-mentioned at least two recipients.

In this embodiment, the execution body of the method for acquiring recipient information may be the first terminal (for example, the first terminal 101, 102, or 103 shown in FIG. 1). The first terminal may receive from the user a sharing instruction regarding the target link in real time. The target link may be used for pointing to an order filling interface in the target shipping application related to a bulk shipping order corresponding to at least two recipients. The target shipping application may be a shipping application installed on the first terminal. The sharing instruction may be used for instructing to share the target link to the target group chat in the target social application, and the group members of the target group chat may include the above-mentioned at least two recipients.

It should be noted that, the sharing instruction may include, but is not limited to, a target link, a social application identifier, a group chat identifier, etc. The target social application may be a social application already installed on the first terminal and indicated by the social application identifier. The target group chat may be, for example, a group chat indicated by the group chat identifier in the target social application. In addition, the target group chat may be created before the user triggers the sharing instruction regarding the target link.

As an example, the group chat conversation interface corresponding to the target group chat may include, but is not limited to, a message display area, a message sending area, and the like. The message sending area may include a message textbox and a sending button. The user may copy the target link into the message textbox, and then trigger the sharing instruction regarding the target link by clicking the sending button.

As another example, a first server (for example, the first server 105 shown in FIG. 1) that provides support for the target shipping application may provide the first terminal with sharing entry information corresponding to the target social application. The user may trigger, for the target link, the sharing entry information to open the corresponding sharing interface, then select a target group chat through the sharing interface, and then perform a preset sharing instruction trigger operation, to send the sharing instruction regarding the target link to the first terminal. The sharing entry information may include, for example, a sharing button related to the sharing interface. The sharing button may be set with the attribute open-type="share", and an onShareAppMessage event. The attribute value "share" may be used to trigger user forwarding. The onShareAppMessage event may be used to monitor the user's click on the sharing button and customize the forwarding content. In addition, the attribute and the event may be set through an API (Application Program Interface, application programming interface) of the second server which provides support for the target social application, the API being available to the outside. The user may trigger the onShareAppMessage event by clicking the sharing button, which may evoke the sharing interface.

It should be noted that the target shipping application may be an application separately installed on the first terminal, or an applet integrated into the target social application, which is not specifically limited herein.

Step 302: Performing a corresponding sharing operation based on the sharing instruction, so that the above-mentioned at least two recipients fill in the recipient information through the order filling interface pointed to by the target link which is shared to the target group chat, and submit the recipient information to the first server that provides support for the target shipping application.

In this embodiment, the first terminal may execute a corresponding sharing operation based on the received sharing instruction, so that the above-mentioned at least two recipients fill in the receipt information through the order filling interface pointed to by the target link which is shared to the target group chat, and submit the recipient information to the first server that provides support for the target shipping application.

As an example, in response to the sharing instruction, the first terminal may send a corresponding sharing request to a second server that provides support for the target social application, so that the second server sends the target link to a second terminal used by the above-mentioned at least two recipients, thus the second terminal may display the target link in the message display area on the group chat conversation interface corresponding to the target group chart in the target social application installed on the second terminal.

If a recipient among the above-mentioned at least two recipients sees the target link shared in the target group chat, the receipt may trigger the target link to open the corresponding order filling interface. The recipient may fill in the corresponding recipient information on the order filling interface, and then submit the recipient information to the first server by performing a preset recipient information submission operation. For example, the first server may actively send the received recipient information to the first terminal. Alternatively, the first server may also send the received recipient information to the first terminal in response to receiving the recipient information acquisition request related to above-mentioned at least two recipients sent by the first terminal.

It should be noted that the recipient information may include, but is not limited to, the recipient's name, telephone number, recipient address, and so on.

It should be noted that in order to enable the first server to acquire information related to the target group chat, such as the group name of the target group chat, the user nicknames of the group members in the target group chat, the user avatar, the user gender and the filled recipient information, etc., the attribute withShareTicket may be set to be true through the API of the second server, the API being available to the outside. In this way, when the target link is shared to the target group chat, the first server may acquire a shareTicket when the target link is opened by a group member in the target group chat, and the first server may acquire the information about the target group chat according to the shareTicket. The shareTicket may be understood as a unique identifier for each sharing.

Step 303: Receiving recipient information returned by the first server.

In this embodiment, the first terminal may receive the recipient information returned by the first server.

Alternatively, the first terminal may also automatically display the received recipient information to the user. For example, the first terminal may automatically fill the received recipient information in a corresponding position in the order filling interface, and show the user the order filling interface after the recipient information is filled therein.

In some alternative implementations of this embodiment, the recipient information received by the first terminal from the first server may have been desensitized. For example, part of the recipient information has been replaced with special characters such as " " and "#". It should be noted that by desensitizing the recipient information, the security of the recipient information can be ensured and the recipient information can be prevented from being leaked.

In some alternative implementations of this embodiment, if the recipient information received from the first server is information that has not been desensitized, the first terminal may first desensitize the received recipient information based on a preset desensitization rule, and then the desensitized recipient information is filled in the corresponding position in the order filling interface, and the order filling interface with the recipient information filled therein is shown to the user.

Figure 4:
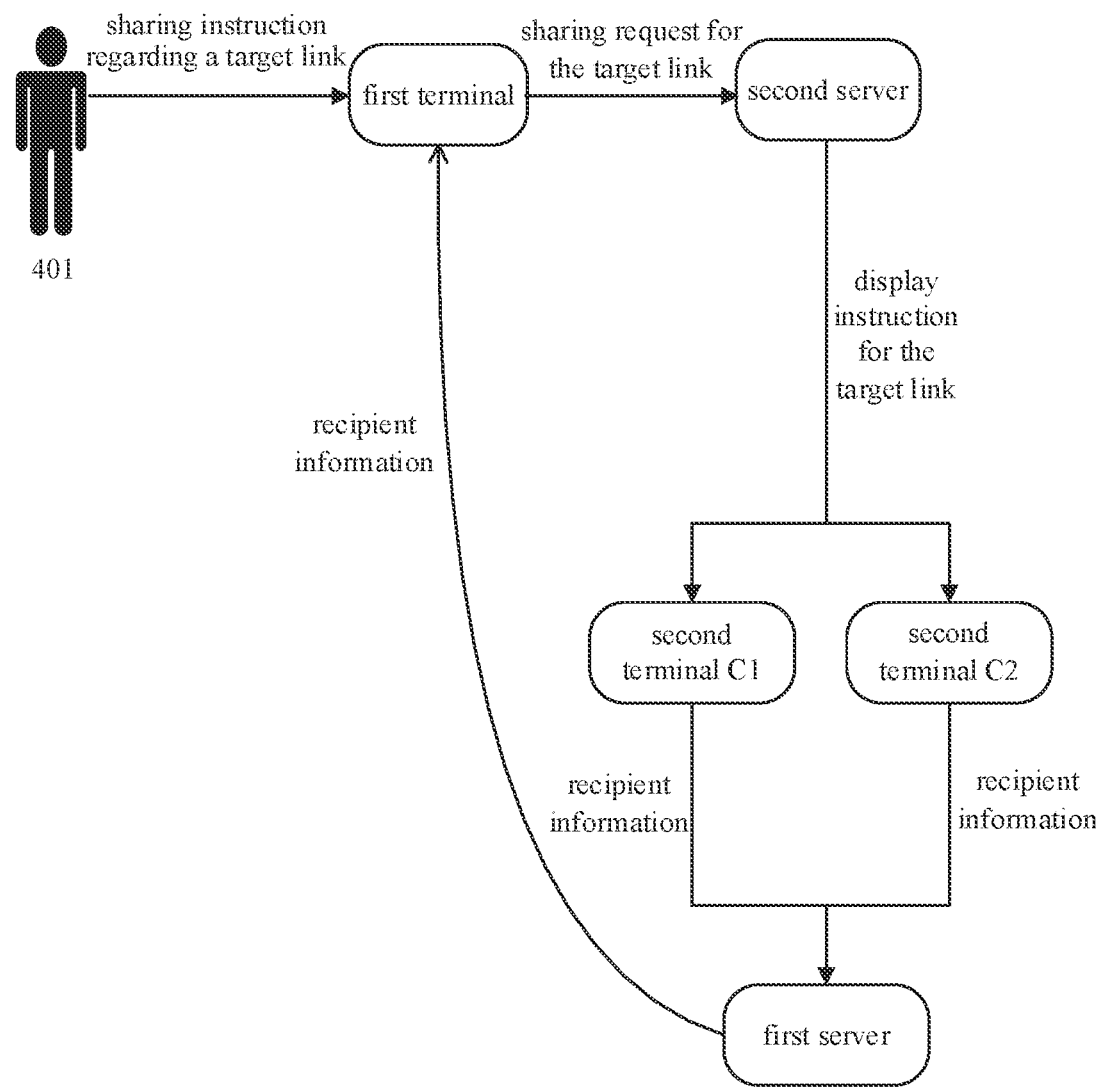
FIG. 4 is a schematic diagram of an application scenario of the method for acquiring recipient information according to some embodiments of the present disclosure.

Continue to refer to FIG. 4, which is a schematic diagram of an application scenario of the method for acquiring recipient information according to this embodiment. In the application scenario of FIG. 4, a social application A may be installed on the first terminal. The social application A may be integrated with a shipping application B. In addition, the first terminal may store a target link used for pointing to the order filling interface in the shipping application B related to a bulk shipping order corresponding to at least two recipients. Here, it is assumed that the at least two recipients include recipients P1 and P2. In addition, there is a target group chat in the social application A, and the group members of the target group chat include recipients P1 and P2. In addition, the target group chat corresponds to the group chat identifier.

In this application scenario, when the user to which the first terminal belongs shown by reference number 401) intends to complete the placing of the above-mentioned bulk shipping order, the user may perform a preset operation for triggering the sharing instruction for the target link, to send the sharing instruction for the target link to the first terminal, where the sharing instruction is used for instructing to share the target link to the above-mentioned target group chat. Then, the first terminal may send a sharing request for sharing the target link to a second server that provides support for the social application A based on the sharing instruction. After that, the second server may send a displaying instruction for displaying the target link to the second terminal C1 used by the recipient P1 and the second terminal C2 used by the recipient P2, respectively, based on the sharing request. The display instruction may include, for example, the target link and the group chat identifier of the target group chat. Then, the second terminals C1 and C2 may display the target link on the group chat conversation interface corresponding to the target group chat based on the display instruction. Then, the recipients P1 and P2 may trigger the target link on the respective group chat conversation interface to open the corresponding order filling interface, and fill in the recipient information on the interface, and then perform a preset operation for submitting the recipient information, the recipient information is sent to the first server that provides support for the shipping application B through the second terminal. Then, the first server may return the received recipient information to the first terminal. Finally, after the user acquires the recipient information of the recipients P1 and P2, the user may perform a preset order-placing operation to complete the placing for the above-mentioned bulk shipping order.

In the method provided by above-mentioned embodiments of the present disclosure: receiving from the user a sharing instruction regarding a target link, where the target link is used for pointing to the order filling interface related to the bulk shipping order of the corresponding at least two recipient in the target shipping application, and the sharing instruction is used for instructing to share the target link to a target group chat in the target social application, the group members of the target group chat include the at least two recipients; and then performing the corresponding sharing operation based on the sharing instruction, so that the at least two recipient fills in the recipient information through the order filling interface pointed to by the target link shared to the target group chat, and submits the recipient information to the first server that provides support for the target shipping application; and then receiving the recipient information returned by the first server. Since the user does not need to manually fill in the recipient information, rapid acquisition of recipient information can be achieved while the user's operating cost is saved, and in turn the placing of the bulk order can be quickly and simply.

With further reference to FIG. 5, it shows a flow 500 of a method for acquiring recipient information according to another embodiment. The flow 500 of the method for acquiring recipient information includes following steps:

Step 501: Receiving from a user a sharing instruction regarding a target link. The target link is used for pointing to an order filling interface in the target shipping application related to bulk shipping order corresponding to at least two recipients. The sharing instruction is used for instructing to share the target link to the target group chat in the target social application, and the group members of the target group chat include above-mentioned at least two recipients.

Step 502: Performing a corresponding sharing operation based on the sharing instruction, so that the above at least two recipients fill in the recipient information through the order filling interface pointed to by the target link shared to the target group chat, and submit the recipient information to the first server that provides support for the target shipping application.

In this embodiment, the explanations of steps 501 and 502 may be referred to the related explanations of steps 301 and 302 in the embodiment shown in FIG. 3, which will not be repeated here.

Step 503: In response to a check instruction of the user on the order filling interface pointed to by the target link, sending a recipient information acquisition request related to the above-mentioned at least two recipients to the first server.

In this embodiment, the execution body of the method for acquiring recipient information may be the first terminal (for example, the first terminal 101, 102, or 103 shown in FIG. 1). When the user intends to check the filling status of the recipient information, the user may trigger the target link, to send a check instruction for the order filling interface pointed to by the target link to the first terminal. In response to the check instruction, the first terminal may send a recipient information acquisition request related to the above-mentioned at least two recipients to a first server (for example, the first server 105 shown in FIG. 1).

Step 504: Receiving recipient information returned by the first server.

In this embodiment, after sending the recipient information acquisition request related to the above-mentioned at least two recipients to the first server, the first terminal may receive recipient information returned by the first server.

It should be noted that the recipient information returned by the first server may be information that has been desensitized, or information that has not been desensitized.

Step 505: Filling the received recipient information in a corresponding position in the order filling interface pointed to by the target link, and showing the user the order filling interface with the recipient information being filled therein.

In this embodiment, the first terminal may fill the received recipient information in a corresponding position in the order filling interface pointed to by the target link, and show the user the order filling interface with the recipient information being filled therein.

As an example, regardless of whether the received recipient information is desensitized information or not, the first terminal may directly fill the received recipient information in the order filling interface pointed to by the target link.

As another example, if the recipient information received by the first terminal from the first server is information that is not desensitized, in order to ensure the security of the recipient information and prevent the recipient information from being leaked, the first terminal may desensitize the received recipient information according to a preset desensitization rule, to obtain the desensitized recipient information. Then the first terminal may fill the desensitized recipient information in the corresponding position in the order filling interface pointed to by the target link.

It can be seen from FIG. 5 that, compared with embodiments corresponding to FIG. 3, the flow 500 of the method for acquiring recipient information in this embodiment highlights the following steps: a step of sending the recipient information acquisition request related to the above-mentioned at least two recipients to the first server, in response to the check instruction of the user for the order filling interface pointed to by the target link; and a step of filling the received recipient information in the corresponding position in the order filling interface pointed to by the target link and showing the user the order filling interface after the recipient information is the filled in the order filling interface. Therefore, the solution described in this embodiment can realize the diversity of recipient information acquisition. In addition, by filling the received recipient information in the corresponding position in the order filling interface pointed to by the target link, and showing the user the order filling interface after filling in the recipient information, the automatic input of the recipient information can be realized, so as to save the user's operating cost, and to facilitate the user to understand the filling status of the recipient information.

In an alternative implementation for acquiring recipient information provided by each embodiment of the present disclosure, the first terminal may acquire the target link before receiving the user's sharing instruction regarding the target link. Here, the first terminal may acquire the target link in response to an instruction of the user for acquiring the target link. Alternatively, the first terminal may also automatically acquire the target link in response to the operation of inputting the sender information by the user on the order filling interface related to the shipping order.

As an example, the target shipping application may be an applet related to the target social application. The second server that provides support for the target social application may have a link generation function. The first terminal may send a target link generation request to the second server, and receive the target link returned by the second server.

As another example, the first terminal may send a target link generation request to the first server, and receive the target link returned by the first server.

As still another example, a thread for generating links may be running on the first terminal. The first terminal may use the thread to generate the target link based on the parameter information of the order filling interface.

In an alternative implementation for acquiring recipient information provided by an embodiment of the present disclosure, the order filling interface is already filled with sender information. In response to an order-placing instruction of a user for a bulk shipping order, the first terminal may send the order-placing request for the bulk shipping order to the first server based on the order-placing instruction, so that the first server may send the sender information and the recipient information of the at least two recipients corresponding to the bulk shipping order to the third server for generating the shipping order. Here, the third server may provide the first server with a bulk order-placing interface. The first server may send the sender information and the recipient information of the at least two recipients corresponding to the bulk shipping order to the third server by calling the hulk order-placing interface.

In an alternative implementation for acquiring recipient information provided by an embodiment of the present disclosure, the target link may correspond to a category identifier. The category identifier may be used for indicating that the order filling interface pointed to by the target link is for filling of a bulk shipping order, and for indicating at least one of the following: forwarding the target link in the target social application is not allowed, a recipient is allowed to submit recipient information for a preset number of times (for example, 1).

When the category identifier of the target link indicates that forwarding the target link in the target social application is not allowed, the second server may control, based on the category identifier, that only the group members in the target group chat are allowed to use the target link, and the group members in the target group chat are not allowed to forward the target link to other people or group chat. For example, when a group member in the target group chat long presses the target link to evoke the option list, the forwarding option may be hidden, and the group member is presented with the option list that does not include the forwarding option, so as to limit the group members in the target group chat from forwarding the target link. In this way, it is possible to prevent people who do not belong to the recipient from submitting useless information, and to prevent the sender information from being leaked.

When the category identifier of the target link indicates that a recipient is allowed to submit recipient information for a preset number of times (for example, 1), the first server may control, based on the category identifier, that the number of times the recipient submits the recipient information, in order to avoid the recipient to submit the recipient information multiple times. For example, when the first server receives the recipient information submitted by the recipient, the times of submissions of the recipient information related to the target link submitted by the recipient may be counted, and determine whether the number of times of submissions is greater than the preset number. If the number of times of submissions is greater than the preset number, the first server may return to the second terminal used by the recipient a prompt message for prompting repeated submission of recipient information.

In an alternative implementation for acquiring recipient information provided by an embodiment of the present disclosure, before receiving from the user a sharing instruction regarding the target link, the first terminal may receive form the user a creation instruction for creating a target group chat that is triggered by the target social application. The creation instruction may include the identifier of the user and identifiers of at least two recipients. Then, the first terminal may send the creation request for creating the target group chat to the second server that provides support for the target social application based on the creation instruction, so that the second server creates the target group chat based on the creation request. Here, when creates the target group chat, the second server may also create a group chat conversation interface of the target group chat, and may return the group chat conversation interface to the first terminal.

Figure 6:
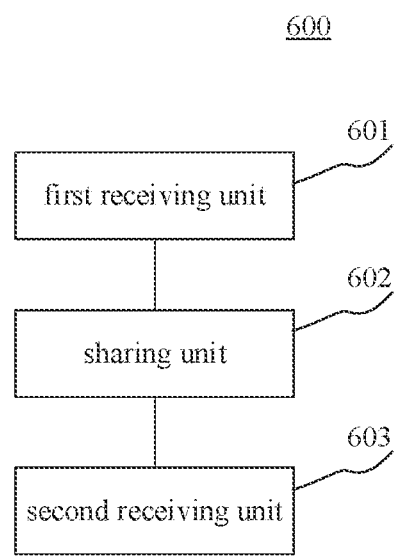
FIG. 6 is a schematic structural diagram of an apparatus for acquiring recipient information according to an embodiment of the present disclosure.

Further reference to FIG. 6, as an implementation of the methods shown in the above figures, an embodiment of the present disclosure provides an apparatus for acquiring recipient information, which corresponds to the method embodiment shown in FIG. 2, the apparatus may be applied to various electronic devices.

As shown in FIG. 6, the apparatus 600 for acquiring recipient information in this embodiment includes: a first receiving unit 601, configured to receive from a user a sharing instruction regarding a target link, the target link being used for pointing to an order filling interface related to a shipping order corresponding to a recipient in a target shipping application, the sharing instruction being used for instructing to share the target link with the recipient; a sharing unit 602, configured to perform a corresponding sharing operation based on the sharing instruction so that the recipient fills in the recipient information through the order filling interface pointed to by the shared target link, and submits the recipient information to a first server providing support for the target shipping application; and a second receiving unit 603, configured to receive the recipient information returned by the first server.

In this embodiment, in the apparatus 600 for acquiring recipient information: the processing of the first receiving unit 601, the sharing unit 602, and the second receiving unit 603 and the technical effects thereof may be referred respectively to the related description of step 201, step 202, and step 203 in the embodiment corresponds to FIG. 2, which will not be repeated herein.

In some alternative implementations of this embodiment, the above-mentioned shipping order may be bulk shipping order, the bulk shipping order may correspond to at least two recipients, and the sharing instruction may be used for instructing to share the target link to the target group chat in the target social application, the group members of the target group chat include the at least two recipients.

In some alternative implementations of this embodiment, the above-mentioned apparatus 600 may further include: a first sending unit (not shown in the figure), configured to: before the second receiving unit receives the recipient information returned by the first server, send a recipient information acquisition request related to the at least two recipients to the first server in response to a check instruction of the user on the order filling interface pointed to by the target link; and a display unit (not shown in the figure), configured to: after receiving the recipient information returned by the first server, fill the received recipient information in a corresponding position in the order filling interface pointed to by the target link, and display to the user the order filling interlace with the recipient information filled therein.

In some alternative implementations of this embodiment, the recipient information returned by the first server may be desensitized information.

In some alternative implementations of this embodiment, the display unit may be further configured to: desensitize the received recipient information to acquire the desensitized recipient information; and fill the desensitized recipient information in the corresponding position in the order filling interface pointed to by the target link.

In some alternative implementations of this embodiment, the above-mentioned apparatus 600 may further include: an acquiring unit (not shown in the figure), configured to acquire the target link, before the first receiving unit 601 receives from the user the sharing instruction regarding the target link.

In some alternative implementations of this embodiment, the target shipping application is an applet related to the target social application, a second server providing support for the target social application has a link generation function; and the acquiring unit may be further configured to send a request for generating the target link to the second server and receive the target link returned by the second server.

In some alternative implementations of this embodiment, the acquiring unit may be further configured to: send a request for generating the target link to the first server; and receive the target link returned by the first server.

In some alternative implementations of this embodiment, the order filling interlace may be filled with sender information; and the above-mentioned apparatus 600 may also include: an order-placing unit (not shown in the figure) configured to: in response to an order-placing instruction of the user for the bulk shipping order, send an order-placing request for the bulk shipping order to the first server based on the order-placing instruction, so that the first server sends the sender information and the recipient information of the at least two recipients to a third server used for generating the shipping order.

In some alternative implementations of this embodiment, the target link may correspond to a category identifier, and the category identifier may be used for indicating that the order filling interface pointed to by the target link is for filling in the bulk shipping order, and for indicating at least one of the following: forwarding the target link in the target social application is not allowed, a recipient is allowed to submit recipient information only for a preset number of times.

In some alternative implementations of this embodiment, the above-mentioned apparatus 600 may further include: a third receiving unit (not shown in the figure), configured to receive an instruction for creating the target group chat, the instruction for creating the target group chat being triggered through the target social application by the user, the instruction for creating the target group includes identifier of the user and identifiers of the at least two recipients; and a second sending unit (not shown in the figure), configured to send a request for creating the target group chat to a second server based on the instruction for creating the target group chat, the second server providing support for the target social application, so that the second server creates the target group chat based on the request for creating the target group.

In the apparatus provided by above-mentioned embodiments of the present disclosure: receiving from a user a sharing instruction regarding a target link, the target link being used for pointing to an order filling interface related to a shipping order corresponding to a recipient in a target shipping application, the sharing instruction being used for instructing to share the target link with the recipient; and then performing the corresponding sharing operation based on the sharing instruction, so that the recipient fills in the recipient information through the order filling interface pointed to by the shared target link, and submits the recipient information to the first server that provides support for the target shipping application; and then receiving the recipient information returned by the first server. Since the recipient information the user does not need to be manually filled by the user, rapid acquisition of recipient information can be achieved while the user's operating cost can be saved.

Figure 7:
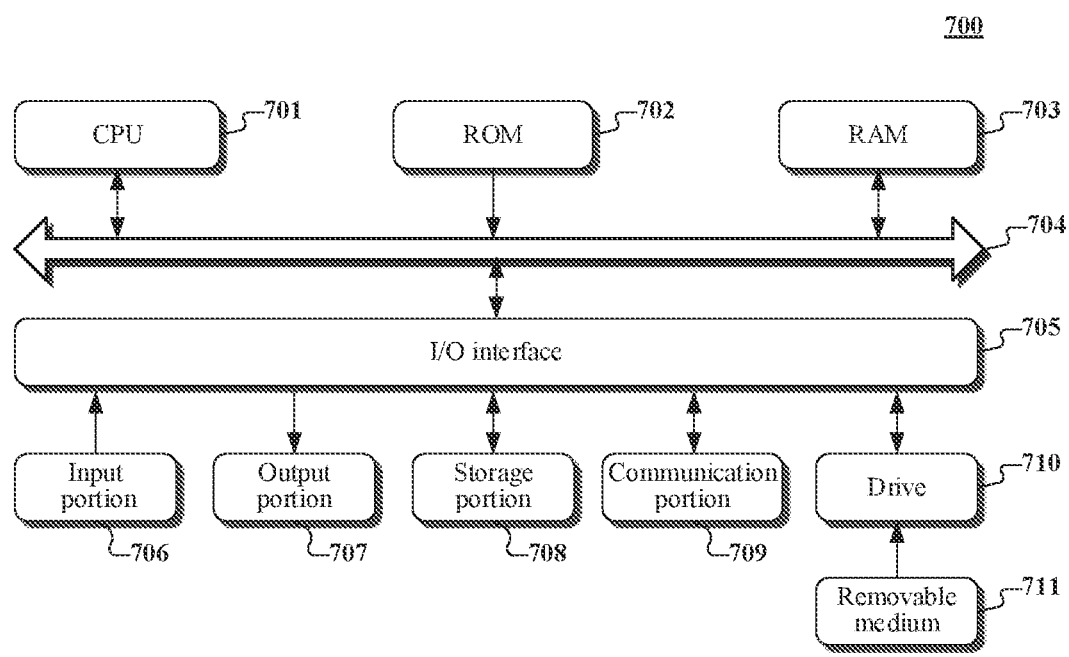
FIG. 7 is a schematic structural diagram of a computer system suitable for implementing electronic devices of some embodiments of the present disclosure.

Referring now to FIG. 7, which illustrates a schematic structural diagram of a computer system 700 suitable for implementing electronic devices (for example, the first terminals 101, 102, and 103 shown in FIG. 1) of embodiments of the present disclosure. The electronic device shown in FIG. 7 is only an example, and should not bring any limitation to the function and scope of use of embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, Which comprises a computer program that is hosted in a machine-readable medium. The computer program comprises program codes for executing the method as illustrated in the flow chart. In such an embodiment, the computer program may be downloaded and installed from a network via the communication portion 709, and/or may be installed from the removeable medium 711. The computer program, when executed by the central processing unit (CPU) 701, implements the above mentioned functionalities as defined by the system of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java. Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure max be implemented by means of software or hardware. The described units or modules may also be provided in a processor, for example, described as: a processor, comprising a first receiving unit, a sharing unit and a second receiving unit, where the names of these units or modules do not in some cases constitute a limitation to such units or modules themselves. For example, the first receiving unit may also be described as "a unit for receiving from a user a sharing instruction regarding a target link."

In another aspect, some embodiments of the present disclosure further provides a computer-readable storage medium. The computer-readable storage medium may be the computer storage medium included in the apparatus in the above described embodiments, or a stand-alone computer-readable storage medium not assembled into the apparatus. The non-volatile computer-readable storage medium stores one or more programs. The one or more programs, when executed by a device, cause the device to: receiving from a user a sharing instruction regarding a target link, the target link being used for pointing to an order filling interface related to a shipping order corresponding to a recipient in a target shipping application, the sharing instruction being used for instructing to share the target link with the recipient; performing a corresponding sharing operation based on the sharing instruction so that the recipient fills in the recipient information through the order filling interface pointed to by the shared target link, and submits the recipient information to a first server providing support for the target shipping application; and receiving the recipient information returned by the first server.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring recipient information, applied to a first terminal, the method comprising:
    monitoring a click on a sharing button corresponding to a target social application;
    in response to the click, displaying a sharing interface, receiving through the sharing interface a selection on a target group chat in the target social application, and receiving through the sharing interface a sharing instruction regarding a target link, the target link being used for pointing to an order filling interface of a target shipping application, wherein the order filling interface is used to fill recipient information including names and addresses of at least two recipients of a bulk shipping order, the sharing instruction being used for instructing the first terminal to share the target link with the target group chat in the target social application, wherein group members of the target group chat include the at least two recipients;
    performing a corresponding sharing operation based on the sharing instruction, wherein the corresponding sharing operation comprises: sending the target link to a second server providing support for the target social application, so that the second server sends the target link to second terminals of the at least two recipients through the target social application installed in the second terminals, so that the at least twos recipients fill in the recipient information of the at least two recipients through the order filling interface pointed to by the shared target link, and submits the recipient information of the at least two recipients to a first server providing support for the target shipping application; and
    receiving the recipient information of the at least two recipients returned by the first server, automatically filling the recipient information in a corresponding position in the order filling interface, and displaying on the first terminal the order filling interface filled with the recipient information.

2. The method according to claim 1, wherein, before receiving the recipient information returned by the first server, the method further comprises:
    in response to a check instruction of the user on the order filling interface pointed to by the target link, sending a recipient information acquisition request related to the at least two recipients to the first server.

3. The method according to claim 2, wherein the recipient information returned by the first server is desensitized recipient information.

4. The method according to claim 2, wherein, the filling the received recipient information in the corresponding position in the order filling interface pointed to by the target link comprising:
    desensitizing the received recipient information to acquire the desensitized recipient information; and
    filling the desensitized recipient information in the corresponding position in the order filling interface pointed to by the target link.

5. The method according to claim 1, wherein, before receiving the sharing instruction regarding the target link, the method further comprising:
acquiring the target link.

6. The method according to claim 5, wherein, the target shipping application is an applet related to the target social application, the second server providing support for the target social application has a link generation function; and
the acquiring the target link comprising:
sending a request for generating the target link to the second server; and
receiving the target link returned by the second server.

7. The method according to claim 5, wherein, the acquiring the target link comprising:
sending a request for generating the target link to the first server; and
receiving the target link returned by the first server.

8. The method according to claim 1, wherein, the order filling interface is filled with a sender information; and the method further comprises:
in response to an order-placing instruction of the user for the bulk shipping order, sending an order-placing request for the bulk shipping order to the first server based on the order-placing instruction, so that the first server sends the sender information and the recipient information of the at least two recipients to a third server used for generating the shipping order.

9. The method according to claim 1, wherein, the target link corresponds to a category identifier, the category identifier is used for indicating that the order filling interface pointed to by the target link is for filling in the bulk shipping order, and for indicating at least one of the following: forwarding the target link in the target social application is not allowed, or a recipient is allowed to submit recipient information for a preset number of times.

10. The method according to claim 1, wherein, before receiving from the user the sharing instruction regarding the target link, the method further comprises:
receiving an instruction for creating the target group chat, the instruction for creating the target group chat being triggered through the target social application by the user, the instruction for creating the target group includes identifier of the user and identifiers of the at least two recipients; and
sending a request for creating the target group chat to the second server based on the instruction for creating the target group chat, the second server providing support for the target social application, so that the second server creates the target group chat based on the request for creating the target group.

11. An electronic device, comprising:
one or more processors; and
a storage apparatus, storing one or more programs thereon,
wherein the one or more programs, when executed by the one or more processors, cause the one or more processors to implement operations, the operations comprising:
monitoring a click on a sharing button corresponding to a target social application;
in response to the click, displaying a sharing interface, receiving through the sharing interface a selection on a target group chat in the target social application, and receiving through the sharing interface a sharing instruction regarding a target link, the target link being used for pointing to an order filling interface of a target shipping application, wherein the order filling interface is used to fill recipient information including names and addresses of at least two recipients of a bulk shipping order, the sharing instruction being used for instructing the first terminal to share the target link with the target group chat in the target social application, wherein group members of the target group chat include the at least two recipients;
performing a corresponding sharing operation based on the sharing instruction, wherein the corresponding sharing operation comprises: sending the target link to a second server providing support for the target social application, so that the second server sends the target link to second terminals of the at least two recipients through the target social application installed in the second terminals, so that the at least two recipients fill in the recipient information of the at least two recipients through the order filling interface pointed to by the shared target link, and submits the recipient information of the at least two recipients to a first server providing support for the target shipping application; and
receiving the recipient information of the at least two recipients returned by the first server, automatically filling the recipient information in a corresponding position in the order filling interface, and displaying on the first terminal the order filling interface filled with the recipient information.

12. A computer-readable medium, storing a computer program thereon, wherein, when the program is executed by a processor, implements operations, the operations comprising:
monitoring a click on a sharing button corresponding to a target social application;
in response to the click, displaying a sharing interface, receiving through the sharing interface a selection on a target group chat in the target social application, and receiving through the sharing interface a sharing instruction regarding a target link, the target link being used for pointing to an order filling interface of a target shipping application, wherein the order filling interface is used to fill recipient information including names and addresses of at least two recipients of a bulk shipping order, the sharing instruction being used for instructing the first terminal to share the target link with the target group chat in the target social application, wherein group members of the target group chat include the at least two recipients;
performing a corresponding sharing operation based on the sharing instruction, wherein the corresponding sharing operation comprises: sending the target link to a second server providing support for the target social application, so that the second server sends the target link to second terminals of the at least two recipients through the target social application installed in the second terminals, so that the at least two recipients fill in the recipient information of the at least two recipients through the order filling interface pointed to by the shared target link, and submits the recipient information of the at least two recipients to a first server providing support for the target shipping application; and
receiving the recipient information of the at least two recipients returned by the first server, automatically filling the recipient information in a corresponding position in the order filling interface, and displaying on the first terminal the order filling interface filled with the recipient information.

13. The electronic device according to claim 12, wherein, before receiving the recipient information returned by the first server, the operations further comprise:
    in response to a check instruction of the user on the order filling interface pointed to by the target link, sending a recipient information acquisition request related to the at least two recipients to the first server.

14. The electronic device according to claim 13, wherein the recipient information returned by the first server is desensitized recipient information.

15. The electronic device according to claim 13, wherein, the filling the received recipient information in the corresponding position in the order filling interface pointed to by the target link comprising:
    desensitizing the received recipient information to acquire the desensitized recipient information; and
    filling the desensitized recipient information in the corresponding position in the order filling interface pointed to by the target link.

\* \* \* \* \*